United States Patent [19]
Arnett

[11] Patent Number: 5,530,787
[45] Date of Patent: Jun. 25, 1996

[54] OPTICAL FIBER GUIDE FOR PREVENTING SHARP BENDS

[75] Inventor: Jaime R. Arnett, Fishers, Ind.

[73] Assignee: AT&T Corp, Murray Hill, N.J.

[21] Appl. No.: 395,737

[22] Filed: Feb. 28, 1995

[51] Int. Cl.$^6$ ................................................ G02B 6/00
[52] U.S. Cl. .................... 385/137; 385/60; 385/69; 385/76; 385/77; 385/86; 385/136
[58] Field of Search .................. 385/60, 66, 69, 385/70, 76, 77, 78, 83, 84, 86, 87, 136, 137, 32, 59

[56] References Cited

U.S. PATENT DOCUMENTS

| | | | |
|---|---|---|---|
| 4,372,511 | 2/1983 | Knowles | 248/68 R |
| 4,652,082 | 3/1987 | Warner | 385/78 X |
| 4,934,785 | 6/1990 | Mathis et al. | 385/77 X |
| 5,073,044 | 12/1991 | Egner et al. | 385/86 |
| 5,212,752 | 5/1993 | Stephenson et al. | 385/78 |
| 5,233,677 | 8/1993 | Winslow | 385/89 |
| 5,238,426 | 8/1993 | Arnett | 439/557 |
| 5,274,729 | 12/1993 | King et al. | 385/134 |
| 5,347,603 | 9/1994 | Belenkiy et al. | 385/86 |
| 5,419,717 | 5/1995 | Abendschein et al. | 439/577 |

*Primary Examiner*—Brian Healy

[57] ABSTRACT

A curved guide for filamentary signal transmission media such as optical fibers has a curved surface with a radius of curvature greater than a critical radius. Fingers extending from the surface are designed to trap and hold fibers in close proximity to the surface, thus preventing too sharp bending of the fiber. At one end of the guide is a mounting member for mounting the guide to any one of a number of different fiber bearing components such as connectors and coupler holding adapter collars.

26 Claims, 4 Drawing Sheets

OPTICAL FIBER GUIDE FOR PREVENTING SHARP BENDS

FIELD OF INVENTION

This invention relates to a guide for a filamentary transmission medium, and more particularly, to an optical fiber guide primarily for use with a patch panel for supporting and routing optical fibers to minimize signal transmission degradation and strain on the fiber.

BACKGROUND OF THE INVENTION

Present day communications technology is directed more and more to the use of optical fibers for signal transmission. Optical fibers have the undisputed advantage over wire transmission media of far greater signal bandwidth transmission capability, but the physical disadvantage of being far more fragile than metallic wire. Thus, the handling and routing of optical fibers, whether singly or in cables not only demands extreme care in handling, but, also, extra measures of protection for the fibers. In routing either cables or single fibers, it is imperative, for reliable signal transmission, that sharp bends in the fibers be avoided. Inasmuch as the laws of optics apply to such transmission, a too sharp bend in the fiber can and does result in signal loss by virtue of at least some of the transmitted light leaking out of the fiber at the bend. A too sharp, i.e., small radius, bend can also cause at least some further signal degradation if the bend introduces microcracks in the fiber, which reduce or impair the uninterrupted guiding of the optical signals. Most optical fiber being made today is capable of resisting formation of such microcracks, but when the fiber is subjected to recurring external forces, the tendency toward cracking increases.

In most environments where optical fiber cables terminate in, for example, an office building or in other user premises, the individual fibers are separated out of the cable and directed, by means of connectors and patch panels, to the particular user or to the particular signal receiving and/or transmitting equipment. Thus, in a typical patch panel arrangement, the fibers are separated on one side (or face) of the multi-apertured panel, and connectors are affixed to the ends of the fibers. The connectors typically are inserted into couplers mounted in the panel into which connectors or individual fibers are also inserted from the rear side of the panel. Typical of such arrangements are those shown in U.S. Pat. Nos. 5,238,428 of Arnett, which is for electrical connection and 5,274,729 of King, et al., which is for optical fiber connection. It can be appreciated that the cable leading up to the front of the panel affords protection from sharp bends for the individual fibers, and only the small lengths of unprotected fibers that are necessary to reach the different couplers are exposed. Thus, there is little likelihood that the fibers may be kinked or bent too sharply. On the other hand, however, the individual fibers leading away from (or up to) the rear of the panel are essentially unprotected. If these latter fibers are allowed to hang loosely from the rear of the panel, they are in danger of becoming bent, twisted, or kinked, with consequent degradation of transmission, especially when an installer, for example, is working at the rear of the panel, making connections and disconnections.

In U.S. Pat. No. 4,372,511 of Knowles, there is shown an optical fiber strain relief assembly for routing fiber cables from a back plane, which may be the rear surface of, for example, a patch panel, to individual equipment modules. In that assembly, a cable bundle is supported in a straight trough from which individual cables are routed into separate curved troughs having approximately a one inch radius of curvature and arrayed along the straight trough. The individual cables are supported in the curved troughs, which prevent their being bent too sharply, and hence, microcracks and signal transmission degradation and loss are avoided. The assembly is mounted to the backplane by means of individual screws for each of the curved troughs of the assembly, and the cables themselves are retained within their respective troughs by means of straps. Such an arrangement affords protection to the cables by containing them within the troughs and prevents their being bent too sharply. However, the arrangement must be assembled and mounted, and the patent is silent as to the treatment of individual connectorized fibers, for example.

SUMMARY OF THE INVENTION

The present invention is a curved fiber guide comprising an elongated curved supporting member having a curved surface portion from which extends an array of fiber holders, which are L-shaped, and which loosely hold the individual fiber in proximity to or against the curved surface. The supporting member has a strengthening rib on the side thereof opposite the curved surface. One end, i.e., the proximal end, of the supporting member has a mounting member thereon for mounting the guide to a fiber connector or to an adapter collar on a patch panel. In a first illustrative embodiment of the invention, the mounting member comprises a split sleeve adapted to fit over the grip portion of an SC connector, as shown in U.S. Pat. No. 5,212,752 of Stephenson, et al. or the cap portion of an ST connector, as shown in U.S. Pat. No. 4,934,785 of Mathis, et al, or also to fit other types of connectors as well. The sleeve, which is of a suitable plastic material, is sized to fit these or other connectors by reason of its being split longitudinally, which imparts a degree of resiliency sufficient to allow the sleeve to grip connectors of different cross-sectional dimensions in an interference fit. The fiber, which is usually covered with a protective coating or jacket and which extends from the connector, passes through the sleeve and is threaded through L-shaped fingers extending from the curved surface, with alternate fingers being oriented to be open from the top and the bottom, thereby holding the fiber in close proximity to the curved surface. As a consequence, the fiber follows the curved surface through approximately a ninety degree change in direction. The supporting member has extending therefrom, near the distal end, first and second posts which enable the numerous fibers extending from the different openings in the panel to be organized and loosely bunched to obviate interference with adjacent fiber guides and to prevent the fibers from hanging loosely after exiting the guide.

In a second illustrative embodiment of the invention, the mounting member is formed to mate with the adapter collar shown and described in U.S. patent application Ser. No. 08/395,736, pending of Arnett, filed concurrently herewith and is shaped to function as the locking member of the collar, such as the locking member disclosed in that application. This locking member has an opening defining a passage therethrough for the fibers. Inasmuch as there are usually two fibers emerging from the collar, the curved surface of the support member is wider than the support member of the first embodiment adjacent the region where the fibers emerge from the couplers mounted in the collar, i.e., the proximal end, but tapers to roughly the same dimensions as the first embodiment at the distal end.

The fibers thus supported and guided may be routed directly to the particular components of their ultimate destination, or, where there is an excess of fibers, they may be routed to a storage drum such as is shown in U.S. patent application Ser. No. 08/395,735, pending, of Arnett, filed concurrently herewith. Also, the guides of both embodiments are reversible so that the fibers may be routed in opposite directions if so desked.

The principles and features of the present invention will be more readily apparent from the following detailed description, read in conjunction with the accompanying drawings.

DETAILED DESCRIPTION

Figure 1:
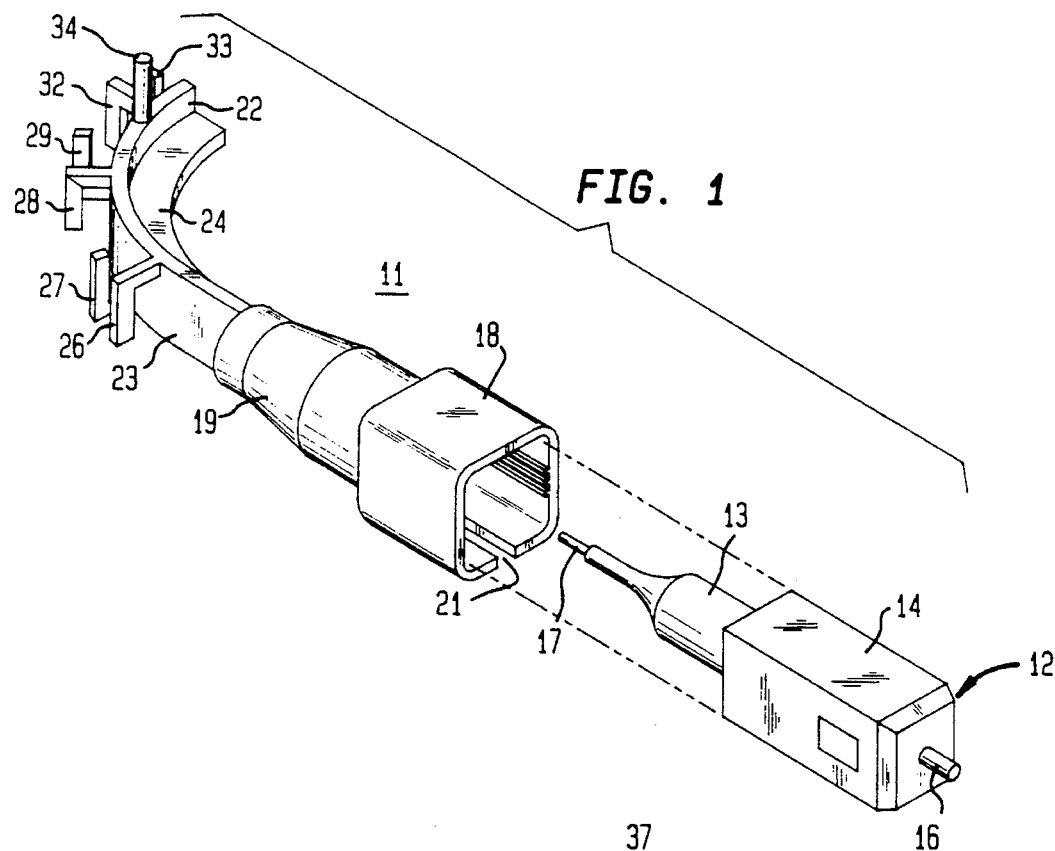
FIG. 1 is a perspective view of a first illustrative embodiment of the invention as used with an SC type connector.
Figure 2:
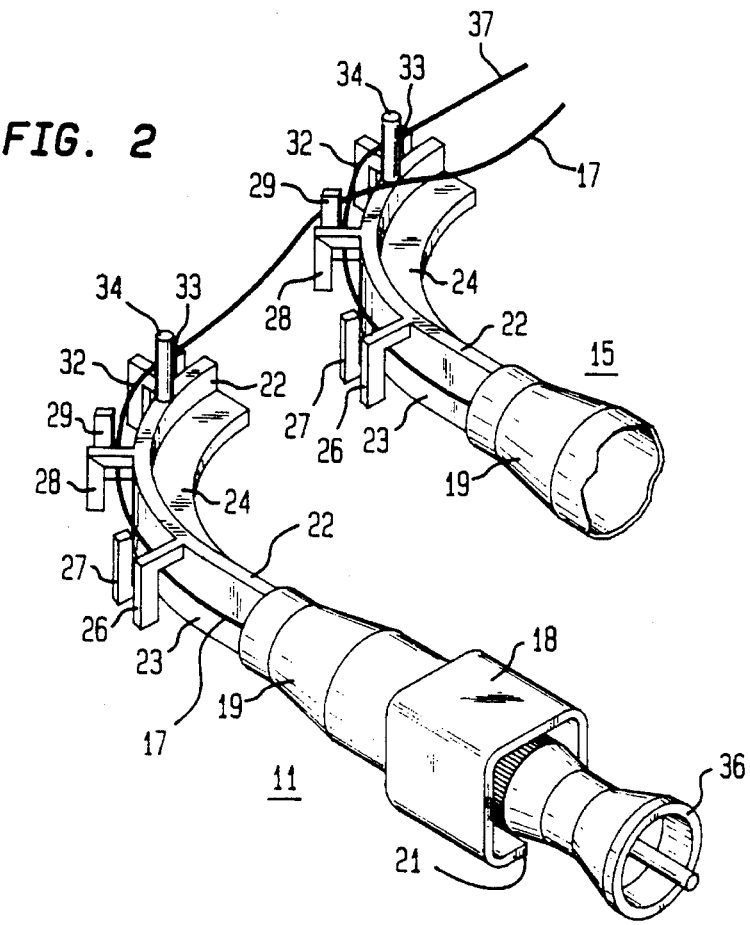
FIG. 2 is a perspective view of the embodiment of FIG. 1 as used with an ST type coupler.

FIGS. 1 and 2 depict a first preferred embodiment of the invention as used with SC and ST types of connectors.

FIG. 1 is a view of the fiber guide 11 of the invention as used with an SC type connector 12. Connector 12 comprises a fiber strain relief portion 13 and a grip portion 14 of substantially square cross-section, and contains a ferrule assembly 16 for a single optical fiber 17. Guide 11 comprises a hollow rectangular section 18 and a tapered cylindrical section 19. A longitudinal split 21 extends completely along the lengths of sections 18 and 19, which imparts a degree of resilience to section 18 even though the entire guide is preferably made of a relatively stiff plastic material. The section 18 can thus be pushed onto grip 14 to embrace it in an interference fit, and the slit 21 in the cylindrical section 19 provides access for the fiber 17 into section 19. Extending from the rear of section 19 is a curvilinear support member 22 having a front curved surface 23 and a strengthening rib 24. Support member 22 and, more particularly, curved surface 23 has a radius of curvature of approximately one and one-half inches (1½ in.), which defines the minimum bend radius for the fiber 17 as it is guided along surface 23. It has been found that a radius of 1½ in. is sufficient to negate any signal transmission degradation resulting from too sharp bending of the fiber.

Extending from the curved surface 23 is a plurality of pairs 26,27; 28,29; and 32,33 of L-shaped fingers, with the even numbered fingers 26, 28 and 32 opening downwardly and the odd numbered fingers 27, 29 and 33 opening upwardly, as shown. The fingers function to trap and hold the fiber in close proximity to, or against, the curved surface 23, as best seen in FIG. 2. It should be noted that some bending of the fiber 17 is necessary in order to thread it through the array of oppositely directed fingers, however, it has been found in practice that with care, there are no deleterious effects. Extending upwardly frown the top edge of member 22 is a post 34, and, on the opposite or bottom edge a similar post, not shown, extends downwardly. The function of the post 34 will best be understood with reference to FIG. 2.

FIG. 2 depicts the guide 11 as used with an ST connector 36 shown as being embraced by section 18. In addition, in order to illustrate the function of posts 34, a portion of a second guide 15, which may be identical to guide 11, is shown, and is intended to represent the next adjacent guide in a patch panel assembly. In practice, a patch panel generally has two arrays of twelve openings each, hence there may be an array of twelve guides 11 in each row and oriented with respect to each other as shown in FIG. 2. As best seen in FIG. 2, fiber 17 emerges from the distal end of guide 11 and is passed to the inside of post 34 of guide 15, between the rear of the patch panel and post 24, which guide 15 functions to guide fiber 37. Thus, emerging from the distal end of guide 15 are fibers 17 and 37, which would then be passed to the insides of the posts of succeeding fiber guides. Posts 34, therefore, function to organize and maintain all of the fibers in close proximity to each other in the rear of the patch panel, and prevent the fibers from hanging loosely where they could be damaged, especially when the patch panel array is being assembled or changed.

It is to be understood that although the embodiment of the invention depicted in FIGS. 1 and 2 has been discussed with reference to its use with SC and ST type connectors, it is equally adaptable to other types of connectors also.

Figure 3:
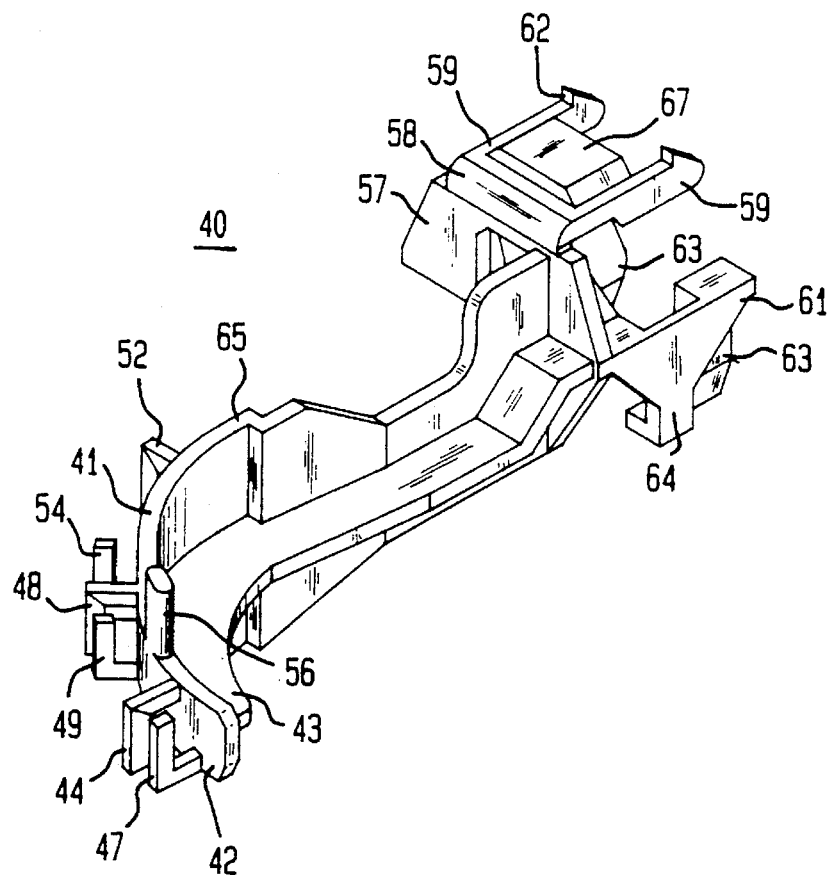
FIG. 3 is a perspective view of a second illustrative embodiment of the invention as adapted for use with the aforementioned adapter collar.
Figure 3A:
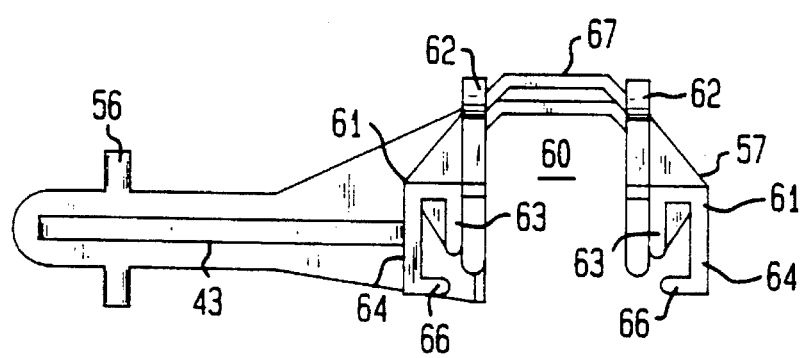
FIG. 3A is an elevation view of the embodiment of FIG. 3 as viewed in the direction of the arrow in FIG. 3.

In FIGS. 3 and 3A there is shown a second embodiment of the invention intended for use with the adapter collar as shown in detail in the aforementioned Arnett patent application Ser. No. 08/395,736, pending, filed concurrently herewith. The collar of the invention disclosed in that application is especially adapted for use with a duplex SC coupler for mounting the coupler in an aperture in a patch panel. The collar comprises a body portion which holds the coupler, and has a resilient cantilevered arms which snap into the opening to hold the collar and coupler in the aperture. The arms are connected to the body and extend along a portion thereof, defining a space between the arms and the body sufficient to allow depression of the arms for mounting the collar. To prevent accidental or inadvertent depression of the arms and hence possible detachment of the collar from the panel, a locking member is provided. The locking member has detents for mounting it to the collar and arms having enlarged portions which fit within the spaces between the cantilevered arms and the body, thereby preventing depression of the arms so that the collar stays locked to the panels. The collar itself has symmetry about a horizontal plane so that the lock may be inserted on the bottom of the collar or the top.

As shown in FIG. 3, the guide 40 comprises a curvilinear support member 41 having a curved surface 42 and a strengthening rib 43. As was the case with the guide 11 of FIGS. 1 and 2, support member 41 and particularly surface 42 have a radius of curvature of approximately one and one-half inches (1½ in.). Extending from curved surface 42 is a plurality of pairs 44,47; 48,49; and 52,53 (not shown in FIG. 3) of L-shaped fingers, with the even numbered fingers opening downwardly and the odd numbered fingers opening upwardly, as viewed in FIG. 3. Also extending from surface 42 is a T-shaped member 54 which opens both upwardly and downwardly, and is located on the surface 42 intermediate finger pairs 48,49 and 52,53. Extending upwardly from the top edge of member 41 is a post 56 and, on the other edge, opposite post 56, a similar post extends downwardly. The function of post 56 (and the downwardly extending post is the same as for post 34 of FIGS. 1 and 2. At one end of member 41 is a mounting member 57, which, as discussed hereinbefore, is intended for use with the collar disclosed in the aforementioned Arnett patent application Ser. No. (Arnett 14).

Mounting and locking member 57 comprises a substantially U-shaped (as viewed from the side and from the front) body 58 having first and second pairs of arms 59,59 and 61,61, only one of the latter being shown in FIG. 3. Each of the arms 59,59 has, at the distal end thereof, a wedge shaped detent 62 which is adapted to fit within openings in the collar as explained in the aforementioned application Ser. No. (Arnett 14) of Arnett, and as will also be apparent in subsequent figures herein. Each of the arms 61 has, at the distal end thereof, a teardrop shaped depending stop member 63, which is adapted to fit between the cantilevered arms of the collar and the body thereof, as explained in application Ser. No. 08/395,736, pending, of Arnett. Each of the arms 61,61 further has a depending leg 64 which terminates at its distal end in an inwardly direct flange 66. As will be apparent hereinafter, legs 64,64 and flanges 66,66 function to help hold mounting member 57 securely in place on the collar. The portion of body 58 between the arms 59,59 is formed as a pressure pad 67 for applying compressive forces to arms 59,59 and 61,61 when mounting guide 40 to the collar or detaching it from the collar. As can be seen in FIG. 3A, the inverted U-shape creates an opening 60 for passage of the fibers through member 57 to the curved portion of the guide.

Figure 4:
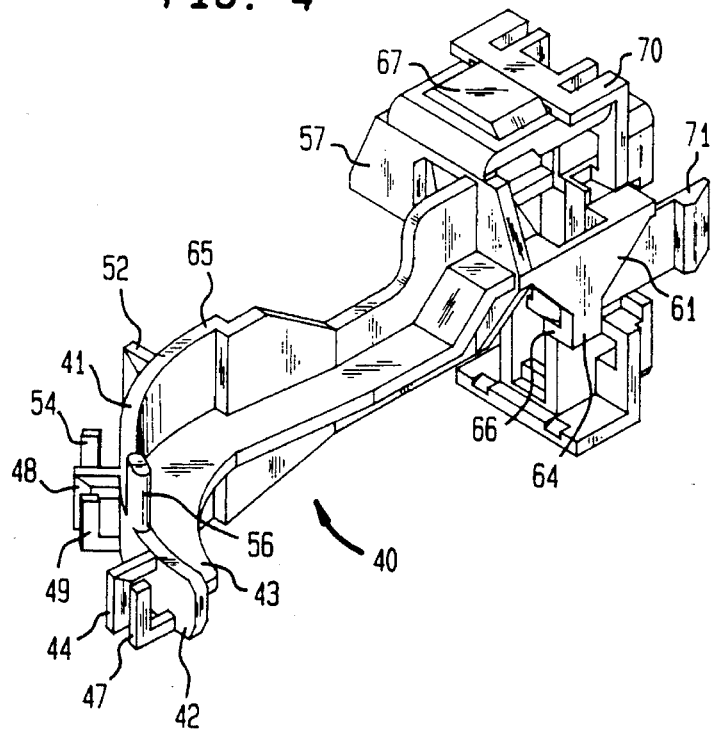
FIG. 4 is a perspective view of the embodiment of FIG. 3 as mounted on the adaptive collar.
Figure 5:
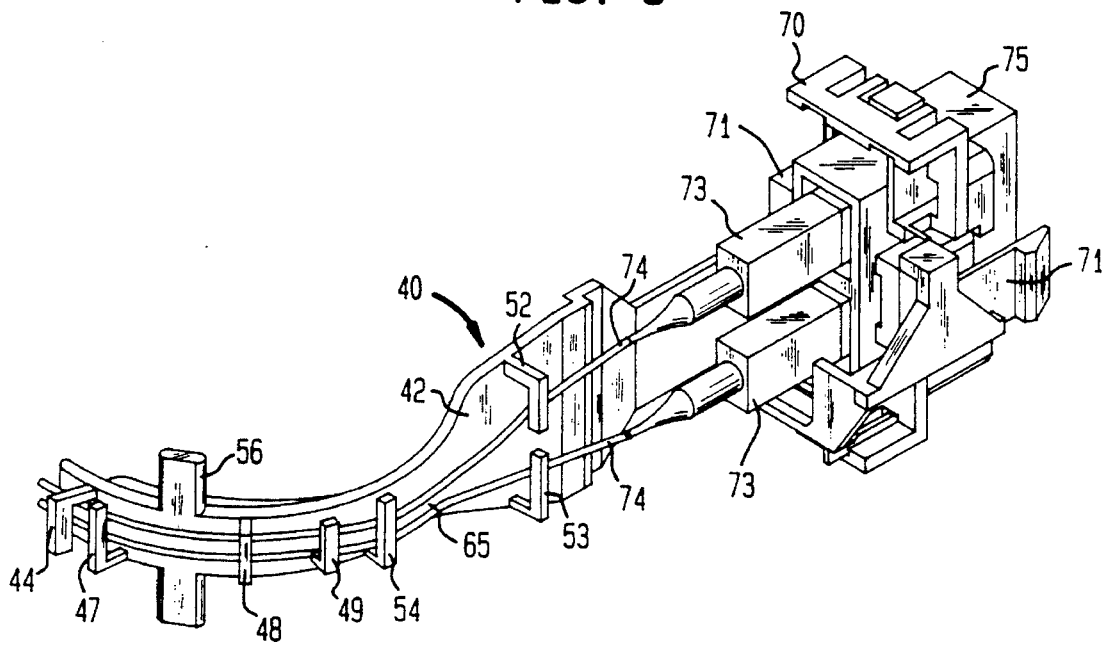
FIG. 5 is a perspective view of the embodiment of FIGS. 3 and 4 as mounted in a reversed position on the collar to that of FIG. 4.

In FIGS. 4 and 5 the guide 40 is shown as mounted to the aforementioned Arnett collar 70 which is symmetrical about a horizontal plane, thus allowing guide 40 to be mounted with the curved portion thereof curving in a first direction (FIG. 4) or in a second direction (FIG. 5). The collar has two cantilevered arms 71,71 spaced from the body thereof for mounting collar 70 in an aperture in a patch panel, and has openings 72,72 for receiving the detents 62,62 and mounting member 57. As was discussed hereinbefore, the teardrop shaped stop member 63,63 fits into the space between each of the cantilevered arms 71,71 and the body of collar 70 to prevent accidental depression of the arms, hence stop members 63,63 are not visible in FIGS. 4 and 5. When mounting member 57 is in place on collar 70, each of flanges 66,66 fits against one edge of the arm 71, as seen in FIGS. 4 and 5, thereby further anchoring member 57 in place and helping to ensure against inadvertent detachment of member 57 from collar 70.

FIG. 5 also depicts a duplex SC coupler 72 mounted in collar 70 into which two SC connectors 73,73 are inserted. Extending from the rear of each of the connectors 73,73 is a single fiber 74,74, preferably coated with a protective coating or otherwise jacketed. As can be seen, fibers 74,74 follow the curved surface 42, being held in proximity thereto by fingers 52,53, T-shaped member 54, and fingers 44, 47, 48 and 49. Because there are two fibers to be guided, surface 42 has an enlarged area 65 for accommodating two fibers, as best seen in FIG. 5.

Figure 6:
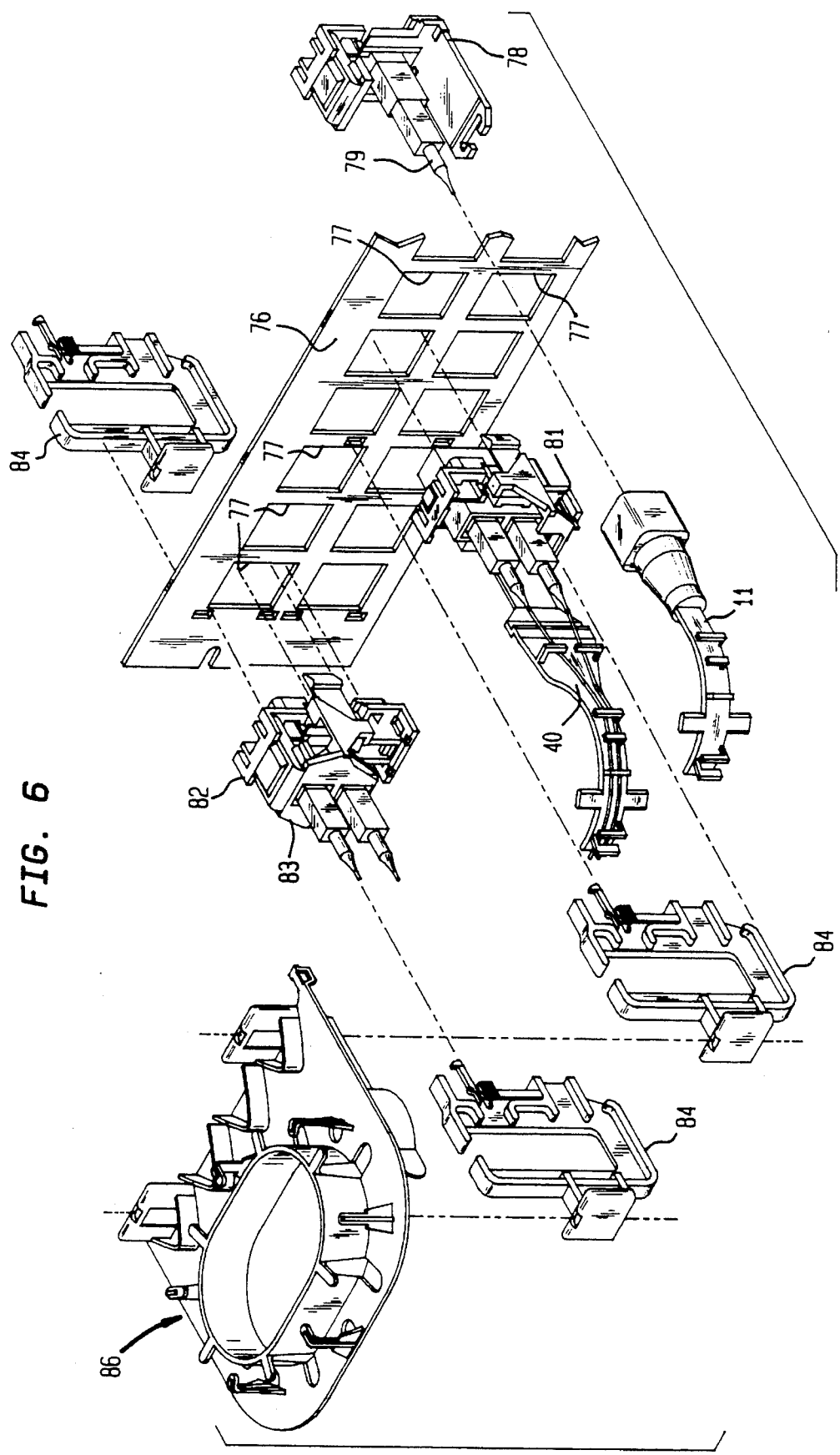
FIG. 6 is a perspective view of a patch panel assembly showing the positioning of the embodiments of the invention and their relationship to a fiber storage drum.

FIG. 6 is a perspective exploded view of a patch panel assembly which includes a patch panel 76 having a plurality of apertures 77,77 therein. For illustrative purposes only, a fiber guide 11 is shown and is to be mounted to an adapter 78 containing a single SC coupler 79. Also shown is a guide 40 mounted to a collar 81 such as disclosed in the aforementioned Arnett application Ser. No. (Arnett 14) and, for illustrative purposes, also as disclosed in that application, a collar 82 and locking member 83. Also mounted to the panel 76 are cable or fiber guides 84,84 which are useful in organizing the fibers or cables and, mounted to a pair of such guides 84,84 is a fiber storage spool 86. The fiber guides 84 and the storage spool 86 are shown and described in the aforementioned U.S. patent application Ser. No. 08/395,735, pending of Jaime Arnett, filed concurrently herewith.

The principles and features of the present invention have been illustrated in two preferred embodiments thereof in which optical fibers are the filamentary transmission media. Other types of transmission media of the filamentary nature might also, where desired, be guided, organized, and protected by the guide of the invention. Numerous changes or modifications to these embodiments, or other, similar embodiments may occur to workers in the art without departure from the spirit and scope thereof.

I claim:

1. A guide for guiding a filamentary transmission medium including at least one optical fiber, said guide having a distal end and a proximal end, and further having a curvilinear surface having a radius of curvature of approximately one and one-half inches;

holding means extending from said surface for holding the filamentary medium in proximity to said curvilinear surface; and mounting means on said proximal end for mounting said guide to a filamentary medium bearing component.

2. A guide as claimed in claim 1 wherein the component is an optical fiber connector and said mounting means comprises a split sleeve adapted to be an interference fit on the optical fiber connector.

3. A guide as claimed in claim 1 wherein the component is an adapter collar for mounting on a panel and said mounting means comprises a locking member for the collar for locking the collar in place on the panel.

4. A guide as claimed in claim 1 wherein said holding means comprises a plurality of L-shaped fingers.

5. An optical fiber guide for preventing sharp bending and kinking of one or more optical fibers, said guide comprising:

an elongated curved support member having a curvilinear surface, distal and proximal ends and upper and lower edges;

a plurality of fiber holders extending from said surface for holding fibers in proximity to said surface, said fiber holders being arranged in spaced pairs arrayed along the length of said curvilinear surface; and mounting means at the proximal end of said support member for mounting said guide to a component adapted to have one or more fibers extending therefrom, said mounting means having a fiber passageway for allowing fibers to pass therethrough.

6. An optical fiber guide as claimed in claim 5 wherein said curvilinear surface has a radius of curvature sufficient to prevent signal transmission degradation in the fiber.

7. An optical fiber guide as claimed in claim 6 wherein said radius of curvature is approximately one and one half inches.

8. An optical fiber guide as claimed in claim 5 wherein each of said fiber holders is an L-shaped member extending from said curvilinear surface.

9. An optical fiber guide as claimed in claim 8 wherein each of said pairs of fiber holders comprises a first L-shaped holder spaced from said first holder and opening toward said upper edge of said support member, 10. An optical fiber guide as claimed in claim 5 and further comprising an organizing post extending from said upper edge near said distal end of said support member.

11. An optical fiber guide as claimed in claim 10 and further comprising an organizing post extending from said lower edge near said distal end of said support member.

12. An optical fiber guide as claimed in claim 5 wherein said mounting means comprises a hollow sleeve member.

13. An optical fiber guide as claimed in claim 12 wherein said hollow sleeve member has a split portion extending along the length thereof.

14. An optical fiber guide as claimed in claim 5 wherein the component is an adapter collar for mounting on a patch panel and said mounting means comprises a locking member having means for attaching said locking member to the adapter collar.

15. An optical fiber guide as claimed in claim 14 wherein said locking member has a substantially U-shape with a first pair of arms forming one leg of the U-shape and a second pair of arms forming the other leg of the U-shape, each of the arms having a distal end.

16. An optical fiber guide as claimed in claim 15 wherein said means for attaching comprises a detent member on the distal end of each of the arms of said first pair of arms.

17. An optical fiber guide as claimed in claim 16 wherein said means for attaching further comprises a depending leg portion on each arm of said second pair of arms, each of said depending leg portions having an inwardly directed flange on the distal end thereof.

18. An optical fiber guide as claimed in claim 15 wherein the distal end of each arm of said second pair of arms has an enlarged portion adapted to be inserted into a portion of the component for locking the component to the patch panel.

19. An optical fiber guide for preventing sharp bending and kinking of one or more optical fibers, said guide comprising:

an elongated curved support member having a curvilinear surface, distal and proximal ends and upper and lower edges, said curvilinear surface having a radius of curvature of approximately one and one-half inches, that is sufficient to prevent signal transmission degradation in the fiber;

a plurality of fiber holders extending from said surface for holding fibers in proximity to said surface; and mounting means at the proximal end of said support member for mounting said guide to a component adapted to have one or more fibers extending therefrom, said mounting means having a fiber passageway for allowing fibers to pass therethrough.

20. An optical fiber guide for preventing sharp bending and kinking of one or more optical fibers, said guide comprising:

an elongated curved support member having a curvilinear surface, distal and proximal ends and upper and lower edges;

an organizing post extending from said upper edge near said distal end of said support member;

a plurality of fiber holders extending from said surface for holding fibers in proximity to said surface; and mounting means at the proximal end of said support member for mounting said guide to a component adapted to have one or more fibers extending therefrom, said mounting means having a fiber passageway for allowing fibers to pass therethrough.

21. An optical fiber guide as claimed in claim 20 and further comprising an organizing post extending from said lower edge near said distal end of said support member.

22. An optical fiber guide for preventing sharp bending and kinking of one or more optical fibers, said guide comprising:

an elongated curved support member having a curvilinear surface, distal and proximal ends and upper and lower edges;

a plurality of fiber holders extending from said surface for holding fibers in proximity to said surface; and mounting means at the proximal end of said support member for mounting said guide to a component adapted to have one or more fibers extending therefrom, said mounting means having a fiber passageway for allowing fibers to pass therethrough, the component being an adapter collar for mounting on a patch panel, and said mounting means comprising a locking member having means for attaching said locking member to the adapter collar, said locking member having a substantially U-shape with a first pair of arms forming one leg of the U-shape and a second pair of arms forming the other leg of the U-shape, each of the arms having a distal end.

23. An optical fiber guide as claimed in claim 22 wherein said means for attaching comprises a detent member on the distal end of each of the arms of said first pair of arms.

24. An optical fiber guide as claimed in claim 23 wherein said means for attaching further comprises a depending leg portion on each arm of said second pair of arms, each of said depending leg portions having an inwardly directed flange on the distal end thereof.

25. An optical fiber guide as claimed in claim 22 wherein the distal end of each arm of said second pair of arms has an enlarged portion adapted to be inserted into a portion of the component for locking the component to the patch panel.

26. A guide for guiding an optical fiber which terminates in a connector, said guide having a distal end and a proximal end, and further having a curvilinear surface having a radius of curvature;

holding means extending from said surface for holding the optical fiber in proximity to said curvilinear surface; and a hollow section at the proximal end of the guide for surrounding the connector in a manner that secures the connector within the hollow section.

* * * * *